(12) United States Patent
Krauch et al.

(10) Patent No.: US 8,522,182 B2
(45) Date of Patent: Aug. 27, 2013

(54) GENERATION OF AN END POINT REPORT FOR A TIMING SIMULATION OF AN INTEGRATED CIRCUIT

(75) Inventors: Ulrich Krauch, Dettenhausen (DE); Kurt Lind, Tuebingen (DE); Alexander Woerner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/314,514

(22) Filed: Dec. 8, 2011

(65) Prior Publication Data

US 2012/0246606 A1  Sep. 27, 2012

(30) Foreign Application Priority Data

Mar. 21, 2011 (EP) ..................................... 11158974

(51) Int. Cl.
*G06F 17/50* (2006.01)

(52) U.S. Cl.
USPC ........................................................ 716/113

(58) Field of Classification Search
USPC .................................................. 716/108, 113
See application file for complete search history.

(56) References Cited

U.S. PATENT DOCUMENTS

2009/0031268 A1* 1/2009 Miranda et al. .................... 716/6
2009/0100394 A1* 4/2009 Sardino et al. .................... 716/6
2010/0211922 A1* 8/2010 Sinha et al. ....................... 716/6

* cited by examiner

*Primary Examiner* — Jack Chiang
*Assistant Examiner* — Mohammed Alam
(74) *Attorney, Agent, or Firm* — Dennis Jung, Esq.; Kevin P. Radigan, Esq.; Heslin Rothenberg Farley & Mesiti P.C.

(57) ABSTRACT

A computer-readable storage storing instructions for a processor. Execution of the instructions causes loading unit timing data descriptive of an upper hierarchy. Execution of the instructions cause the loading of a unit timing path, and the loading of macro timing data into the memory. Execution of the instructions further cause the replacement of at least a portion of the unit timing report with the macro timing data, and computation of arrival times, slacks, and slews. Execution of the instructions also cause computation of path statistics in accordance with the arrival times, slacks and slews, and generation of a end point report for the unit timing path, including path statistics.

20 Claims, 8 Drawing Sheets

GENERATION OF AN END POINT REPORT FOR A TIMING SIMULATION OF AN INTEGRATED CIRCUIT

PRIOR FOREIGN APPLICATION

This application claims priority from European patent application number EP11158974.3, filed Mar. 21, 2011, which is hereby incorporated herein by reference in its entirety.

BACKGROUND

This invention relates to the timing simulation of integrated circuits, and in particular, the construction of a end point report for a timing simulation.

When analyzing the timing report in order to find out whether the designed hardware fits into the clock cycle, the end point report is the best choice. But for larger designs that have aggressive timing goals like CPUs, a hierarchical design is often used to divide the design into handy pieces. But the timing report then ends at the border of these pieces and the other hierarchy components are abstracted using timing assertions.

This abstraction makes timing analysis cumbersome, due to either missing completeness for the lower hierarchy level, or missing details in the higher abstraction level.

End point reports for the lower hierarchy level (called macros) end at the abstraction border and thus become outdated together with the border values, which may change due to changes in other parts of the design. End point reports for the upper hierarchy level (called unit) offer correct and up-to-date timing results, but they do not reveal the design details of the lower hierarchy level, which also hides the root cause for bad timing data.

Also, the timing abstract assertions are created based on a previous timing run and thus do not reflect present reality, but the past. Timing data for the lower hierarchy level is based on these assertions and thus this timing data has the same deviations from present reality like the assertions it is based upon.

BRIEF SUMMARY

Provided herein, in one aspect, is a computer-readable storage medium which stores machine-executable instructions for a processor, wherein execution of the instructions cause the processor to: load unit timing data from a timing simulation of an integrated circuit into a memory, wherein the unit timing data is descriptive of the timing at the upper hierarchy unit level; load a selection of a unit timing path through the integrated circuit from the memory; load macro timing data from the timing simulation into the memory, wherein the integrated circuit comprises macros, wherein the macro timing data is descriptive of timing within the lower hierarchy macros during the simulation; replace at least a portion of a unit timing end point report with the macro timing data along the unit timing path, wherein the unit timing end point report comprises unit timing data, wherein the macro timing data replaces at least a portion of the unit timing data; compute arrival times, slacks, and slews for the unit timing path using the replaced unit timing data; compute path statistics in accordance with the arrival times, slacks, and slews; and generate an end point report for the unit timing path including the path statistics.

In another embodiment, a computer system is provided comprising a processor, wherein the computer system further comprises a computer-readable storage medium storing machine-executable instructions, wherein execution of the instructions cause the processor to: load unit timing data from a timing simulation of an integrated circuit into a memory, wherein the unit timing data is descriptive of the timing at the upper hierarchy unit level; load a selection of a unit timing path through the integrated circuit from the memory; load macro timing data from the timing simulation into the memory, wherein the integrated circuit comprises macros, wherein the macro timing data is descriptive of timing within the lower hierarchy macros during the simulation; replace at least a portion of a unit timing end point report with the macro timing data along the unit timing path, wherein the unit timing end point report comprises unit timing data, wherein the macro timing data replaces at least a portion of the unit timing data; compute arrival times, slacks, and slews for the unit timing path using the replaced unit timing data; compute path statistics in accordance with the arrival times, slacks, and slews; and generate an end point report for the unit timing path including the path statistics.

In a further aspect, a computer-implemented method is provided which includes: loading unit timing data from a timing simulation of an integrated circuit into a memory, wherein the unit timing data is descriptive of the timing at the upper hierarchy unit level; loading a selection of a unit timing path through the integrated circuit from the memory; loading macro timing data from the timing simulation into the memory, wherein the integrated circuit comprises macros, wherein the macro timing data is descriptive of timing within the lower hierarchy macros during the simulation; replacing at least a portion of a unit timing end point report with the macro timing data along the unit timing path, wherein the unit timing end point report comprises unit timing data, wherein the macro timing data replaces at least a portion of the unit timing data; computing arrival times, slacks, and slews for the unit timing path using the replaced unit timing data; computing past statistics in accordance with the arrival times, slacks, and slews; and generating an end point report for the unit timing path including the path statistics.

BRIEF DESCRIPTION OF THE SEVERAL VIEWS OF THE DRAWINGS

Various embodiments of the invention are described below, by way of example only, making reference to the drawings, wherein.

DETAILED DESCRIPTION

Figure 1:
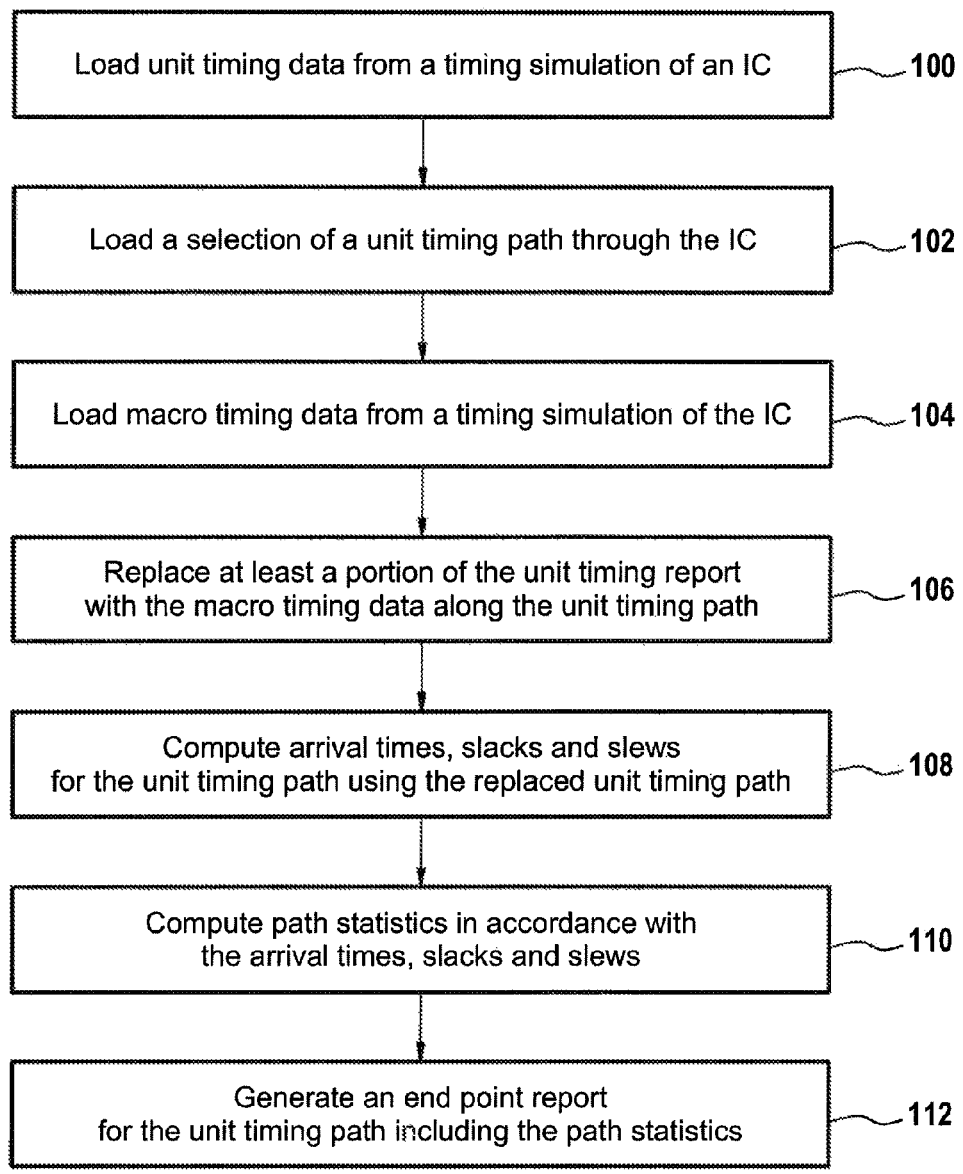
FIG. 1 is a flow chart which illustrates one embodiment of a method, in accordance with one or more aspects of the present invention.

The invention provides for a computer-readable storage medium, a computer system, and a computer-implemented method in the independent claims. Embodiments are given in the dependent claims.

To get the real timing data for the lower hierarchy (macro), the outdated details are correlated with current real data at the border, taken from the current unit timing run of the upper hierarchy.

For example, according to the assertions, the arrival time on a traced end point report path for a receiving macro is 220 ps and thus all subsequent arrival times and slacks on the macro devices are computed based on this time. But in the overall unit timing run, it turns out that the signal arrives later, at 230 ps. To get the correct data for the macro devices, all arrival times must be increased by 10 ps and all slacks must be decreased by 10 ps. When a path had a slack of −10 ps, it turns out that its slack is actually −20 ps and more work needs to be invested to fix the path.

Embodiments of the invention may provide a solution to the above mentioned problems by providing a method of constructing a comprehensive end point report that combines the detailed end point report of the lower hierarchy with the correct timing data of the upper hierarchy.

Based on the upper hierarchy unit timing end point report, the shallow data corresponding to the lower hierarchy macros is replaced by the detailed end point report of the macro. Since the detailed macro data are assertion based and do not correlate with the current timing run, arrival times and slacks are re-computed based on the unit timing data.

This provides correct and detailed data for the whole end point report path, but at the hierarchy borders there are some glitches in signal slews that are caused by the capacitive load differences of the data used to compute the macro timing versus unit timing data. These differences cannot be eliminated based on the timing report data and can only be understood when comparing the assertions used to compute the macro data with the newly generated assertions that are based on the analyzed timing run. The solution is to add the assertion data at the hierarchy border in order to provide the explanation for glitches in slew data and capacitive loads in the comprehensive end point report.

Embodiments of the invention may have a memory model that contains the timing data of the unit upper hierarchy and loads the timing data of the lower hierarchy macros on demand. When the tool is started, the unit timing report data are parsed into memory and can be displayed in the user interface.

The following unit timing data may be parsed into memory:
- End point report, filtering data by slack threshold and/or component name
- Comprehensive report, filtering data by clock phase and/or component name
- Wirecode data
- Assertions generated by this timing run
- Unit assertions used for this run
- Assertions manually maintained (optionally)
- Contract files used to optimally generate new assertions from unit timing All these data may be linked together in memory and can be browsed in the user interface. When browsing the end point report, the user interface provides the option to create the comprehensive end point report for a unit timing path.

To create the comprehensive end point report, the tool either loads existing macro timing data from memory, or automatically loads these data from the macro timing report used to create the unit timing report. The tool extracts the name of the macro to load, using the unit end point report cell name. Using this name, it computes the file pointer to the macro timing report available in the unit timing as file link. Then it parses the following macro timing report data into memory:
- End point report, filtering data by slack threshold
- Comprehensive report, filtering data by clock phase
- Assertions used to compute this macro timing report If the path is not available in the macro end point report, the unit data is used, but augmented with macro assertion data.

When data is available in memory, it starts replacing the shallow macro data of the unit end point report by the detailed data of the macro end point report using the following method for some embodiments:

Path begin
- If the unit end point report path starts with an input pin, the unit assertion for this pin is added as the first line in order to show the unit timing abstract all timing data is related to. Then the wiring entries (wires with length and wire code and buffers) are added until the begin of the first macro is reached. Then it continues the path report as described in topic "Transition from unit wiring to macro".
- If the unit path begins with a macro and is latch-launched, the first macro is loaded and its detailed data is added to the comprehensive end point report until the output pin of the macro is reached. If the path is not available in the macro end point report, the unit data for this macro is used. Then it continues the path report as described in topic "Transition from macro to unit wiring".

After the comprehensive end point path report has started, the following transitions can occur and are handled as described below for some embodiments:

Transition from unit wiring to macro
- At the border to the macro, after the last unit wire segment, the macro input pin assertion from the current timing run is added.
- It is followed by the optional manually maintained assertion.
- Then the black separator row marks the macro data begin.
- Before real macro data is added, the macro input pin assertion used by the macro timing run is inserted, to show the differences between the assertions computed by the current timing run and the old assertions used by the macro timing.
- Then the macro specific shallow data of the unit timing run get replaced by the detailed data of the macro timing run as described in topic "Path begin".

Transition from macro to unit wiring while replacing shallow macro data from unit timing by detailed macro timing data, in case the macro timing path ends with an output pin, a macro pin to unit wire transition is inserted. This transition has the following structure:
- When the output pin data is written, the macro output pin assertion used by the macro timing run is appended, to show the differences between the assertions computed by the current timing run and the old assertions used by the macro timing.

It is followed by the black separator row that marks the macro data end.

Then the optional manually maintained assertion for the macro pin is added.

It is followed by the macro output pin assertion from the current timing run.

Then the unit wiring data (wires and buffers) is added until the shallow report either reaches another macro, or a unit output pin.

Path ends with macro latch

The macro detailed data is added to the report until the receiving latch is reached. The receiving latch line is added and the comprehensive end point report is complete.

Path ends with a unit output pin

The unit wiring data is added until the unit output pin is reached. The output pin data is appended by a row containing its associated output pin assertion and the comprehensive end point report is complete.

When replacing unit timing data by macro detailed data, that macro data is assertion based and thus slacks, slews, and arrival times might not correspond, since assertion data use to be outdated.

Thus these values need to be replaced by, or augmented with the values corresponding to the unit timing. The current implementation shown above uses the computed/compensated values, and adds the original macro data in parentheses for orientation.

The computation of corrected macro data is processed as follows for some embodiments:

Arrival times are computed using the following formula:

$$AT_{new} = AT_{macro} - AT_{delta}$$

Where:

$$AT_{delta} = AT_{macro\ input\ pin\ assertion} - AT_{unit\ timing\ macro\ input\ pin}$$

In case a timing path starts latch launched, the arrival time for the first macro is real and does not need to be compensated, except for the eventual output pin, due to the differences in capacitive load.

Slacks need to be replaced by the unit path slack.

Input and output pin slews need to be replaced by the unit timing values.

While adding macro detailed data to the unit end point report, a set of statistical data can be computed that helps identifying the reasons for bad path timing paths more quickly. It is especially important to quickly identify whether the delay is caused by the unit wiring delay, or by the macros. Even inside the macros, it is important to see, whether the macro wiring delay is excessive and needs to be reduced.

The following statistical data computed together with the comprehensive end point report help identifying excessive delays.

On unit level, the following statistics are computed:

Total Path delay is the sum of all path element delays:

$$\text{Path delay} = \Sigma_{macro\ delay} + \Sigma_{wire\ delay} + \Sigma_{buffer\ delay}$$

Wire delay is the sum of all unit wire segment delays of this path in picoseconds:

$$\text{Total wire delay} = \Sigma \text{wire delay}$$

Relative wire delay is the percentage of unit wire delay relative to the total path delay $$\text{Relative wire delay} = \Sigma \text{wire delay} * 100 / (\Sigma_{macro\ delay} + \Sigma_{wire\ delay} + \Sigma_{buffer\ delay})$$

Buffer delay is the sum of all unit buffer delays of this path in picoseconds:

$$\text{Total buffer delay} = \Sigma_{buffer\ delay}$$

Relative buffer delay is the percentage of buffer delay relative to the total path delay:

$$\text{Relative buffer delay} = \Sigma_{buffer\ delay} * 100 / (\Sigma_{macro\ delay} + \Sigma_{wire\ delay} + \Sigma_{buffer\ delay})$$

Wiring delay is the sum of all unit wire segment and buffer delays of this path in picoseconds:

$$\text{Total wiring delay} = \Sigma_{wire\ delay} + \Sigma_{buffer\ delay}$$

Relative wiring delay is the percentage of unit wiring delay relative to the total path delay:

$$\text{Relative wiring delay} = (\Sigma_{wire\ delay} + \Sigma_{buffer\ delay}) * 100 / (\Sigma_{macro\ delay} + \Sigma_{wire\ delay} + \Sigma_{buffer\ delay})$$

Total macro delay is the sum of all macro delays:

$$\text{Total macro delay} = \Sigma_{macro\ delay}$$

The sum of unit wire and unit buffer delay is equal to the unit wiring delay.

For each macro in the path, similar statistics are computed:

Total macro delay is the sum of all macro element delays in picoseconds $$\text{Total macro delay} = \Sigma_{macro\ device\ delay} + \Sigma_{macro\ wire\ delay}$$

Relative macro delay is the percentage of macro delay relative to the total path delay $$\text{Relative macro delay} = (\Sigma_{macro\ device\ delay} + \Sigma_{macro\ wire\ delay}) * 100 / (\Sigma_{macro\ delay} + \Sigma_{wire\ delay} + \Sigma_{buffer\ delay})$$

Total macro device delay is the sum of all macro device delays in picoseconds $$\text{Total macro device delay} = \Sigma_{macro\ device\ delay}$$

Total macro wire delay is the sum of all macro wire segment delays in picoseconds $$\text{Total macro wire delay} = \Sigma_{macro\ wire\ delay}$$

Relative macro wire delay is the percentage of macro wire delay relative to the total macro delay:

$$\text{Relative macro wire delay} = \Sigma_{macro\ wire\ delay} * 100 / (\Sigma_{macro\ device\ delay} + \Sigma_{macro\ wire\ delay})$$

The sum of the unit wiring and all macro delays is equal to the total path delay. Note that due to rounding errors and slew discrepancies between unit and macro timing data at macro borders, the match might be inexact.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network.

'Computer memory' or 'memory' is an example of a computer-readable storage medium. Computer memory is any memory which is directly accessible to a processor. Examples of computer memory include, but are not limited to: RAM memory, registers, and register files. 'Computer storage' or 'storage' is an example of a computer-readable storage medium. Computer storage is any non-volatile computer-readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

A 'computing device' as used herein encompasses to any device comprising a processor. A 'processor' as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. Many programs have their instructions performed by multiple processors that may be within the same computing device or which may even be distributed across multiple computing devices.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

In one aspect the invention provides for a computer-readable storage medium storing machine executable instructions for a processor. Execution of the instructions causes the processor to load unit timing data from a timing simulation of an integrated circuit into memory. The unit timing data is descriptive of the timing at the upper hierarchy unit level. It can also stand for the timing of a processor core or of the entire processor chip. Important is the separation into the upper hierarchy level consisting of the whole chip, a processor core, or a logical unit like a floating point unit—versus the lower hierarchy macros providing the detailed timing data at logical gate or transistor level. In a timing simulation of an integrated circuit various chunks or portions of the integrated circuit are grouped together as so called macros. The simulation is performed in an iterative manner. The timing of the individual macros is simulated and then the combination of the macros into the logical unit, processor core, or entire integrated circuit are then performed. To simulate the circuit at both the macro and at the level of the entire integrated circuit knowledge of timing for the other is necessary. Therefore this is performed in an iterative fashion with the macros up to the whole integrated circuit being simulated one after the other. The timing at the upper hierarchy unit level refers to the timing of the logical unit, processor core, or entire integrated circuit composed of multiple macros. The lower hierarchy refers to the timing of the individual macros. The rest of the document refers the upper hierarchy as the unit, but similarly applies to a whole processor core or even entire integrated circuit.

Execution of the machine executable instructions further causes the processor to load macro timing data from the timing simulation into the memory. The integrated circuit comprises macros. The macro timing data is descriptive of timings within the lower hierarchy macros during the simulation. Execution of the machine executable instructions further cause the processor to load a selection of a unit timing path through the integrated circuit from the memory. A unit timing path as used herein refers to a path through the gates and latches in the integrated circuit. Execution of the machine executable instructions further cause the processor to replace at least a portion of the unit timing report with the macro timing data along the unit timing path. The unit timing report comprises unit timing data. The macro timing data replaces at least a portion of the unit timing data. The macro timing data is much more detailed than the unit timing data. By replacing at least a portion of the unit timing report with the macro timing data along the unit timing path a more detailed timing information along the unit timing path may be constructed. This may be useful in determining why circuitry along the unit timing path is not meeting its timing requirements.

Execution of the machine executable instructions further cause the processor to compute arrival times, slacks and slews for the unit timing path using the replaced unit timing data. Execution of the machine executable instructions further causes the processor to compute path statistics in accordance with the arrival times, slews and slacks. Execution of the machine executable instructions further cause the processor to generate an end point report for the augmented unit timing path including the path statistics. The augmented unit timing path refers to the unit timing path that has had at least a portion of the unit timing report replaced with the macro timing data along the unit timing path. This embodiment may be beneficial because there is more detailed information along the unit timing path.

In another embodiment execution of the instructions further cause the processor to recalculate the arrival times and the slacks of the replaced unit timing data in accordance with the unit timing end point report. The timing simulation of the integrated circuit may generate the unit timing end point report. The unit timing data may be taken from the unit timing end point report. This embodiment may be beneficial because the arrival times and the slews may be more accurately calculated using the more detailed macro timing data which has replaced a portion of the unit timing report. The unit timing report may be considered to be a unit timing end point report.

In another embodiment the step of generating the end point report comprises summarizing assertion data from the macro and unit timing data adjacent to the arrival times and/or the slacks. The insertion of the assertion data may be beneficial because it allows more easy identification of timing errors. This may facilitate the identification of errors by a human and/or an automated system.

In another embodiment execution of the instructions cause the processor to identify the unit timing path in accordance with the unit timing data. For instance a software module may examine the unit timing data and identify timing paths according to a certain slack threshold. An automated algorithm may then go through and identify unit timing paths which exceed that threshold at the upper hierarchy.

In another embodiment the selection of the plurality of unit timing paths is received. The end point report is generated for each of the plurality of unit timing paths. This embodiment may be beneficial because there may be multiple timing errors within a particular timing simulation.

In another embodiment the selection of all unit timing paths is received. The end point report was generated for all of the unit timing paths. In this embodiment all unit timing paths are selected and the comprehensive end point report is generated.

In another embodiment the path statistics comprise the total path delay. In another embodiment the path statistics comprise the total wire delay. In another embodiment the path statistics comprise the relative wire delay. In another embodiment the path statistics comprise the total buffer delay. In another embodiment the path statistics comprise the relative buffer delay. In another embodiment the path statistics comprise the total wiring delay. In another embodiment the path statistics comprise the relative wiring delay. In another embodiment the path statistics comprise the total macro delay calculated at the macro level. In another embodiment the path statistics comprise the total macro delay calculated for each macro. In another embodiment the path statistics comprise the relative macro delay calculated for each macro. In another embodiment the path statistics comprise the total macro wire delay calculated for each macro. In another embodiment the path statistics comprise the relative macro wire delay calculated for each macro. In another embodiment the path statistics comprise combinations of the previously aforementioned embodiments of the path statistics.

In another embodiment the unit timing data comprises a higher hierarchy end point report filtered by the slack threshold. In another embodiment the unit timing data comprises clock phase information. In another embodiment the unit timing data comprises a component name or names. In another embodiment the unit timing data comprises a higher hierarchy comprehensive report filter by clock phases and component name. In another embodiment the unit timing data comprises wire code data. In another embodiment the unit timing data comprises assertions. In another embodiment the unit timing data comprises unit assertions. In another embodiment the unit timing data comprises manually maintained assertions. In another embodiment the unit timing data comprises contract files used to optimally generate new assertions from unit timing. In another embodiment the unit timing data comprises any combination of the aforementioned embodiments of unit timing data.

In another embodiment the macro timing data comprises a macro end point report filtered by slack threshold and/or clock phase. In another embodiment the macro timing data comprises a macro comprehensive report. In another embodiment the macro timing data comprises macro assertions. In another embodiment the macro timing data comprises any combination of the previously aforementioned embodiments of the macro timing data.

In another embodiment execution of the machine executable instructions further cause the processor to generate the unit timing data and the macro timing data by simulating the integrated circuit. In this embodiment the unit timing data, the macro timing data and other timing data from the timing simulation is generated. This is advantageous because the simulation and the generation of end point report are all combined into a single process. In some embodiments the unit timing path is identified automatically by examining the unit timing data.

In another embodiment the unit timing end point report and the macro timing data are calculated iteratively. This embodiment is advantageous because in order to calculate the macro timing data using the simulation the unit timing data is necessary. Likewise the macro timing data is necessary for calculating the unit timing data. In this way the simulation is run at the macro and upper hierarchy levels iteratively.

In another embodiment execution of the machine executable instructions further causes the processor to detect a set of slew violations over all hierarchy levels of the timing path in the end point report. That is to say that the set of slew violations are detected at both the hierarchy unit level and at the lower hierarchy level. The set of slew violations are identified for both macro and unit timing reports. Execution of the instructions may cause the processor to identify slew violations for both the macro and unit timing points. A macro timing point may also be referred to as a macro timing test point. A unit timing point may also be referred to as a unit timing test point. Macro and unit timing points are the test points for an end point report represented as rows in the end point report. These are the test points the macro timing simulation uses to compute and/or simulate the timing. They may be devices such as a transistor manned gate or other gate. They may also be macro or unit pins. Execution of the instructions further cause the processor to generate a slew violation report using the set of slew violations.

In another aspect the invention provides for a computer system comprising a processor. The computer system further comprises computer-readable storage medium storing machine-executable instructions. Execution of the machine executable instructions causes the processor to load unit timing data from a timing simulation of an integrated circuit into memory. The unit timing data is descriptive of the timing at the upper hierarchy unit level. Execution of the machine executable instructions further causes the processor to load macro timing data from the timing simulation into the memory. The integrated circuit comprises macros. The macro timing data is descriptive of the timing within the lower hierarchy macros during the simulation. Execution of the machine executable instructions further cause the processor to load a selection of the unit timing path through the integrated circuit from the memory.

Execution of the machine executable instructions further cause the processor to replace at least a portion of the unit timing end point report with the macro timing data along the unit timing path. The unit timing end point report comprises unit timing data. The macro timing data replaces at least a portion of the unit timing data.

Execution of the machine executable instructions further causes the processor to compute arrival times, slacks and slews for the unit timing path using the replaced unit timing data. Execution of the machine executable instructions further cause the processor to compute path statistics in accordance with the arrival times, slacks and slews. Execution of the machine executable instructions further cause the processor to generate an end point report for the augmented unit timing path including the path statistics.

In another aspect the invention provides for a computer-implemented method. Likewise the invention also provides for a method. The method comprises the step of loading unit timing data from a timing simulation of an integrated circuit into a memory. The unit timing data is descriptive of the timing of the upper hierarchy unit level. The method further comprises the step of loading macro timing data from the timing simulation into the memory. The integrated circuit comprises macros. The macro timing data is descriptive of timing within the lower hierarchy macros during the simulation. The method further comprises the step of loading a selection of the unit timing path through the integrated circuit from the memory. The method further comprises the step of replacing at least a portion of a unit timing end point report with the macro timing data along the unit timing path. The unit timing end point report comprises unit timing data. The macro timing data replaces at least a portion of the unit timing data. The method further comprises the step of computing arrival times, slacks and slews for the unit timing path using the replaced unit timing data. The method further comprises the step of computing path statistics in accordance with the arrival times, slacks and slews. The method further comprises the step of generating an end point report for the augmented unit timing path including the path statistics.

In the following, like numbered elements in these figures are either similar elements or perform an equivalent function. Elements which have been discussed previously will not necessarily be discussed in later figures if the function is equivalent.

FIG. 1 shows a flowchart which illustrates a method according to an embodiment of the invention. In step 100 unit timing data is loaded from a timing simulation of an integrated circuit (IC). Next in step 102 a selection of a unit timing path through the integrated circuit is loaded. Next in step 104 macro timing data is loaded from a timing simulation of the integrated circuit. In step 106 at least a portion of the unit timing report is replaced with the macro timing data along the unit timing path. In step 108 arrival times, slacks and slews are computed for the unit timing path using the replaced unit timing data. Next in step 110 path statistics are computed in accordance with the arrival times, slacks and slews. Finally in step 112, an end point report is generated for the augmented unit timing path including the path statistics.

Figure 2:
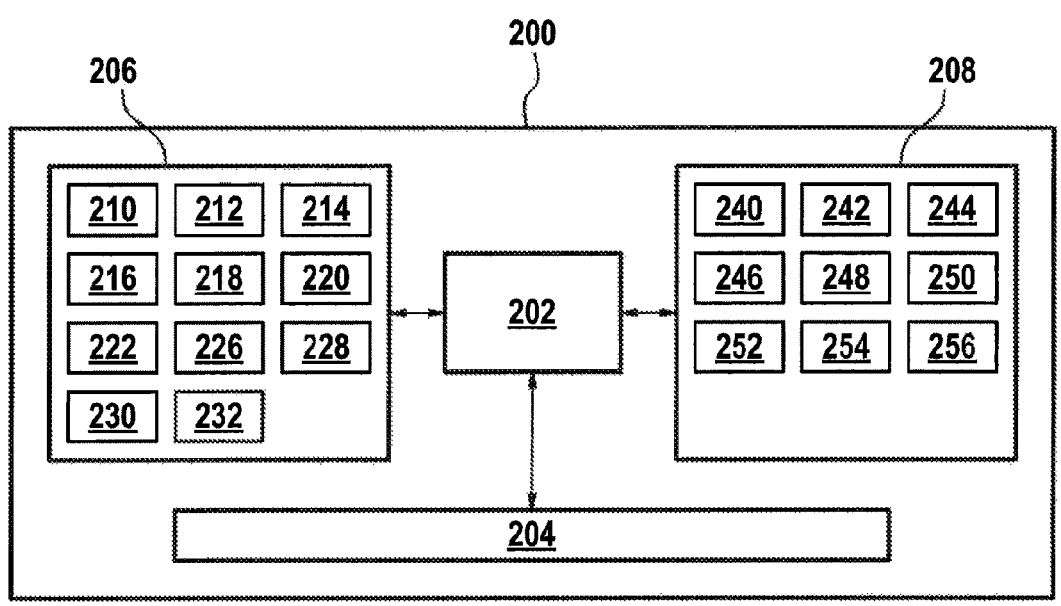
FIG. 2 illustrates a computer system, in accordance with one or more aspects of the present invention.

FIG. 2 shows a computer system 200 according to an embodiment of the invention. The computer system 200 comprises a processor 202. The processor 202 is connected to a user interface 204, computer storage 206 and computer memory 208. The computer storage 206 is shown as containing unit timing data 210. The computer storage 206 is further shown as containing macro timing data 212. The computer storage 206 is further shown as containing a unit timing path 214. In some embodiments the unit timing path may be multiple unit timing paths. The computer storage 206 is further shown as containing a unit timing end point report 216. The unit timing data 210 may comprise the unit timing end point report 216. The computer storage 206 is also shown as containing arrival times 218, slacks 220 and slews 222 which are calculated using a modified unit timing end point report 226. The computer storage 206 is further shown as containing path statistics 228 which are calculated using the arrival times 218, the slacks 220 and the slews 222. The computer storage 206 is further shown as containing a slew violation report 230 and an augmented or comprehensive end point report path 232.

The computer memory 208 is shown as containing a program 240 for performing a method of generating an end point report. The computer memory 208 is further shown as containing additional software modules. For instance there is a timing simulation module 242. The timing simulation module 242 contains computer-executable code for executing a timing simulation of an integrated circuit. The computer memory 208 is further shown as containing a computation module 244. The computation module contains computer-executable code for calculating the arrival times 218, the slacks 220 and the slews 222 using the modified end point report 226.

The computer memory 208 is further shown as containing a path statistics calculation module 246. The path statistics calculation module 246 contains computer-executable code for calculating the path statistics 228 using the arrival times 218, the slacks 220 and the slews 222. The computer memory 208 is further shown as containing an assertion data handling module 250. The assertion data handling module 250 contains computer-executable code for handling of assertion data. The computer memory 208 is shown as further containing a unit timing path identification module 252. The unit timing path identification module 252 is present in some embodiments and is adapted for identifying a unit timing path 214 automatically. The computer memory 208 is further shown as containing a slew violation detection module 254 which contains computer-executable code for identifying slew violations. The computer memory 208 is further shown as containing a slew violation report generation module 256. The slew violation report generation module contains computer-executable code for generating the slew violation report 230.

Figure 3:
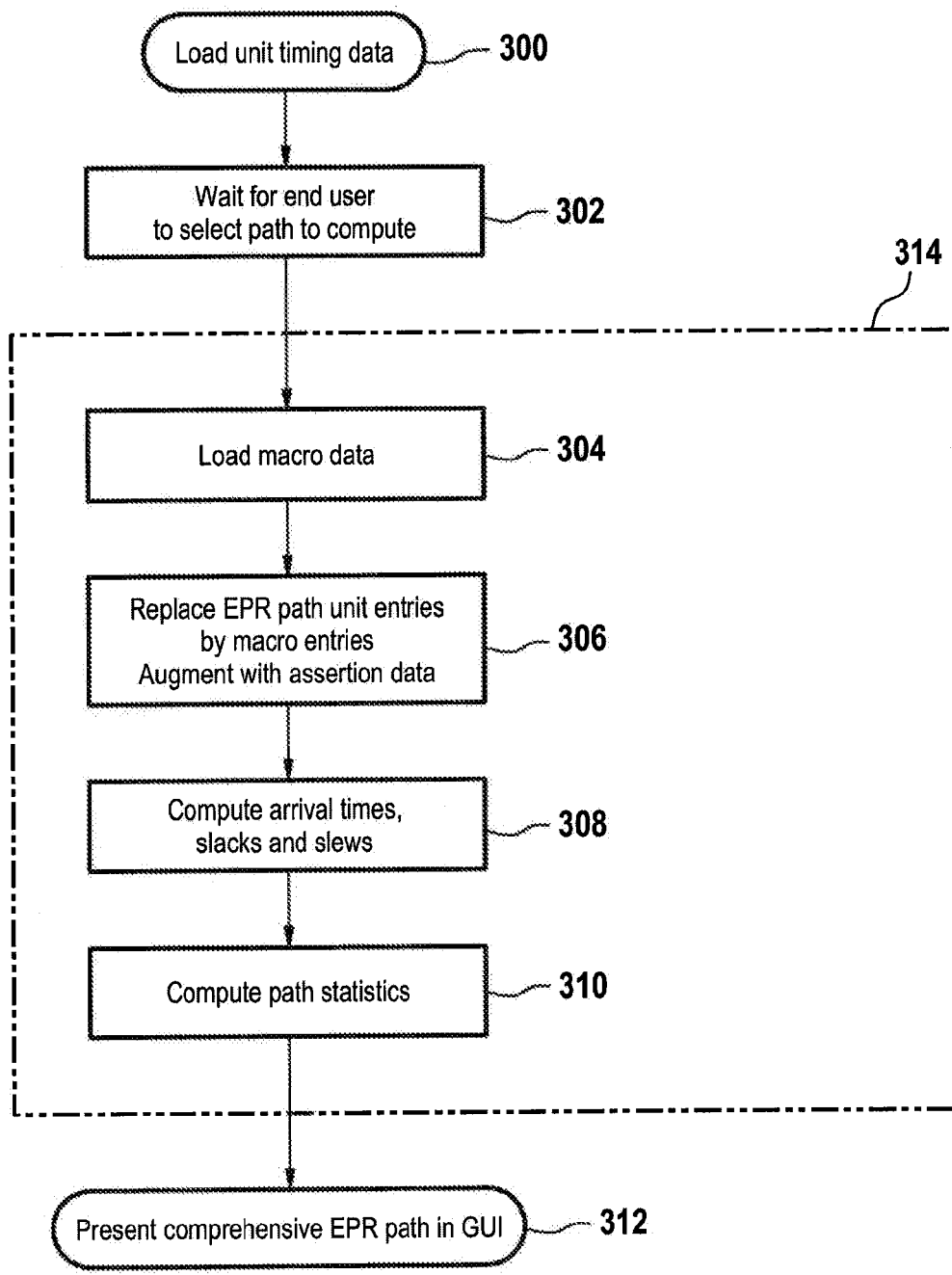
FIG. 3 is a flow chart which illustrates one embodiment of a further method, in accordance with one or more aspects of the present invention.

FIG. 3 shows a flow diagram which illustrates a method according to a further embodiment of the invention. First in step 300 unit timing data is loaded; the files which have the timing data for the upper level hierarchy possibly descriptive of the whole integrated circuit or just a subset of macros is loaded. Next in step 302 the end user selects a unit timing path to compute. This is a path through the integrated circuit including the latches and set of logic devices to the next storage point. This may in some instances be considered to be a path which traces the path of signals.

In some embodiments this is selected automatically, for instance a list of paths that were too slow or had timing errors could automatically be selected. Next in step 304 macro data is loaded. Step 306 replaces end point report path unit entries by macro entries and augments this data with assertion data. Next in step 308 arrival times, slacks and slews are computed. In step 310 path statistics are computed. Finally in step 312 a comprehensive end point report path is displayed on a graphical user interface. The steps 304, 306, 308, 310 inside the dot dot dashed box 314 are explained in more detail in FIG. 5.

Figure 4:
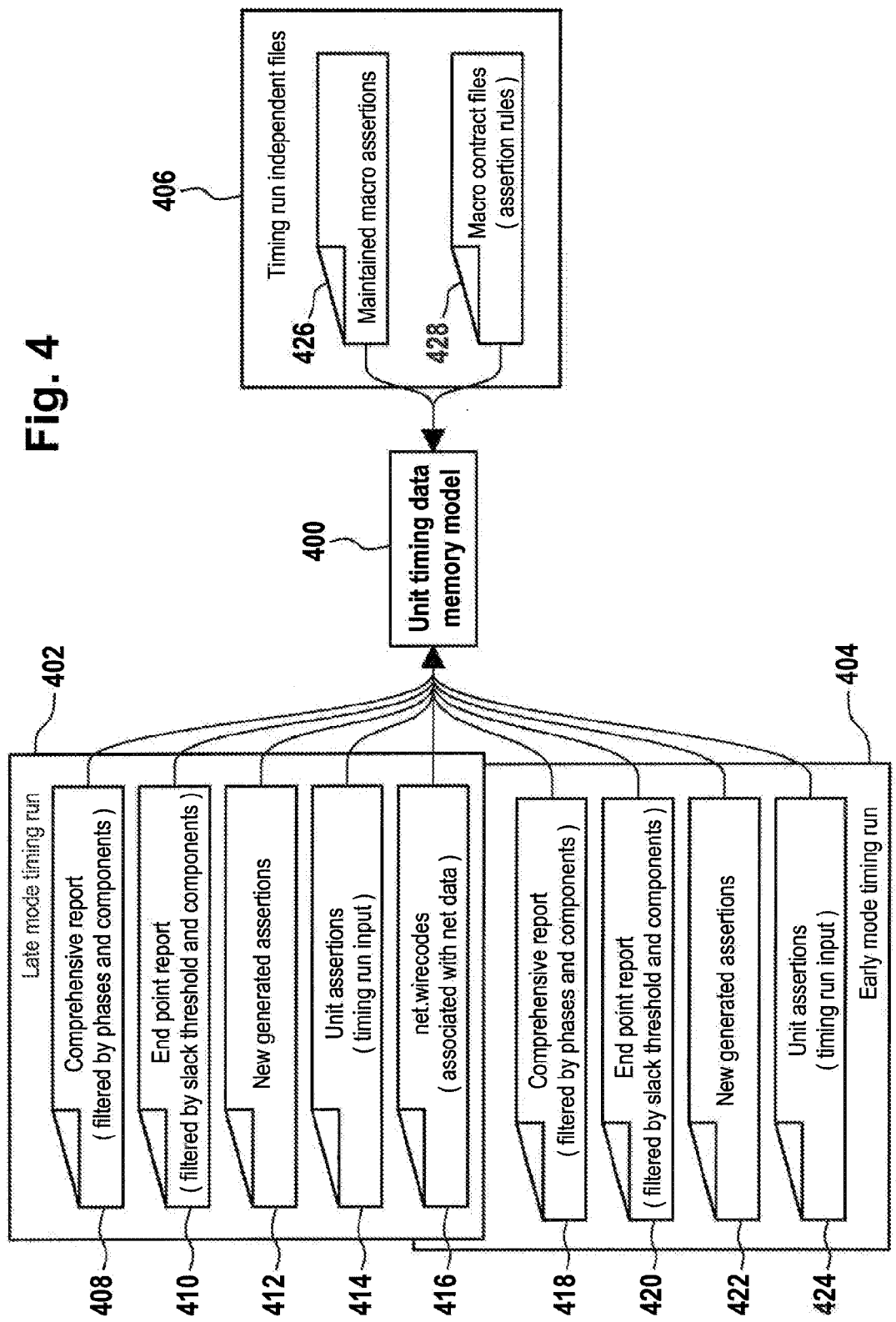
FIG. 4 illustrates the step of loading unit timing data, in accordance with one or more aspects of the present invention.

FIG. 4 describes step 300 of FIG. 3 in greater detail. This is the step of loading unit timing data. In FIG. 4 there is a unit timing data memory model 400 which is used to decide which files to load during loading of the unit timing data. Three different types of files are loaded. There are files associated with the late model timing run 402, files associated with early mode timing run 404, and timing run independent files 406.

For the late model timing run files 402 there are several different types of files. 408 is a comprehensive report which is possibly filtered by phases and components. There is also an end point report which may be filtered by slack threshold and components. The late mode timing run also may comprise newly generated assertions 412, unit assertions 414 as part of the timing run (simulation) input, and net wire codes which may be associated with net data 416. Files associated with early mode timing run 404 may be a comprehensive report which may be filtered by phases and components. The early mode timing run files may also include an end point report 420 which is possibly filtered by slack threshold and components. The early mode timing run 404 files may also comprise newly generated assertions 422 and unit assertions 424 as part of the timing run input. The timing run independent files 406 may include maintained macro assertions 426 and macro contract files which may contain assertion rules 428. The unit timing data memory model 400 is able to filter these files and decide which ones to load.

Figure 5:
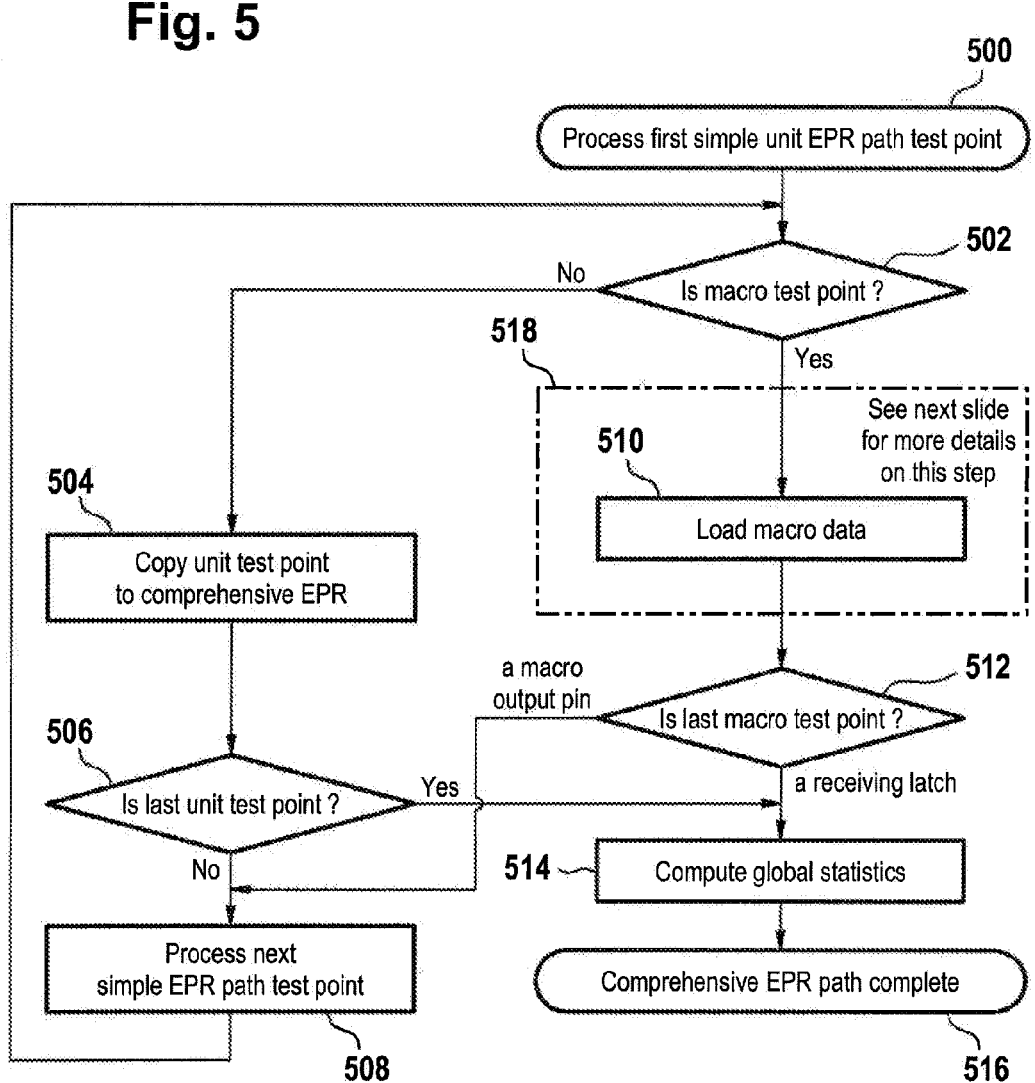
FIG. 5 is a flow chart which illustrates a portion of FIG. 3 in greater detail, in accordance with one or more aspects of the present invention.

FIG. 5 shows a flow diagram which illustrates the steps 304, 306, 308, 310 performed in block 314 of FIG. 3. In FIG. 5 a method of assembling a comprehensive end point report is detailed. In step 500 a first simple unit end point report path test point is processed. Step block 502 is a decision point which decides if it is a macro test point or not. If no then proceed to block 504. If yes then proceed to block 510. Block 504 copies the unit test point to comprehensive end point report 504. After block 504 block 506 is next. This is again a decision block and the question is if it is last unit test point. If no then proceed to block 508, if yes then proceed to block 514. Block 508 processes the next simple end point report path test point and closes the loop to step 502 to traverse the diagram for this next test point. Going back to block 502, if this is a macro test point then block 510 is performed. Block 510 loads macro data. The dot dot dashed line 518 shows steps 510 that will be explained in greater detail in FIG. 6. After performing block 510 there is decision block 512. The question is whether the last macro test point is a macro output pin or a receiving latch. If it is a macro output pin then block 508 is performed. If the macro test point is a receiving latch then block 514 is processed. Block 514 computes global statistics. Block 516 completes the comprehensive end point report path.

Figure 6:
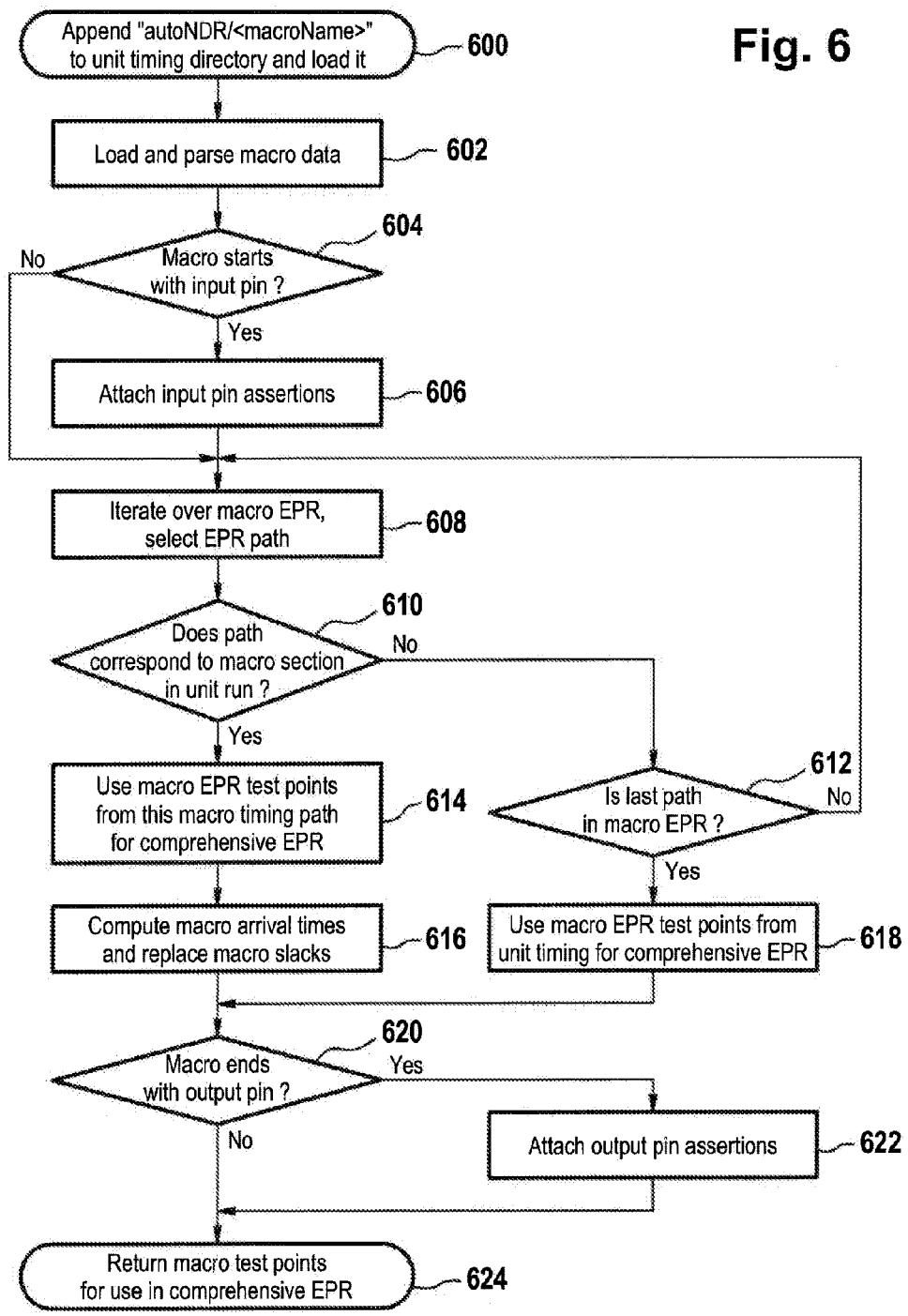
FIG. 6 is a flow chart which illustrates a portion of FIG. 5 in greater detail, in accordance with one or more aspects of the present invention.

FIG. 6 shows a more detailed example of how the macro data is loaded when constructing a comprehensive end point report. In step 600 a macro specific extension is appended to the unit timing directory path name and the directory with the resulting name is opened. Next in step 602 the macro data is loaded and parsed. Step 602 will be explained in greater detail in FIG. 7. Next step 604 is a decision box; the question is whether the macro starts with an input pin. If the answer is no then block 608 is performed, if the answer is yes then block 606 is performed. In block 606 input pin assertions are attached. This may include assertions from macro timing, unit timing, and maintained assertions, as well as replacing the macro pin slew by its unit timing value. After block 606, block 608 is performed. Block 608 iterates over a macro end point report and selects a matching end point report path. Next block 610 is performed. Block 610 is a decision block. The question is does path correspond to macro section in unit run. This correspondence is checked by path start point pin name=macro section start net name in unit, path end point pin name=macro section end net name in unit, and timing phases which must match too in both cases above. If the result if no then block 612 is performed, if yes then block 614 is performed. Block 612 checks whether this is the last path in macro end point report. If the answer is no then block 608 is performed again, if the answer is yes then block 618 is performed. Block 618 is use macro end point report test points from unit timing for comprehensive end point report. After block 618 is performed block 620 is performed. Returning to block 610 if the path does correspond to the macro section in the unit run then block 614 is performed. In block 614 the use of macro end point report test points from this macro timing path for comprehensive end point report is ensured. Next block 616 is performed. Block 616 computes macro arrival times and replaces macro slacks. After block 616 block 620 is performed. Block 620 is a decision box, the question is macro ends with output pin, if no then block 624 is performed, if yes then block 622 is performed. Block 622 attaches output pin assertions. These assertions may include assertions from macro timing, unit timing, and maintained assertions, as well as replacing the macro pin slew by its unit timing value. After block 622 is performed block 624 is performed. Block 624 returns the macro test points for use in comprehensive end point report.

Figure 7:
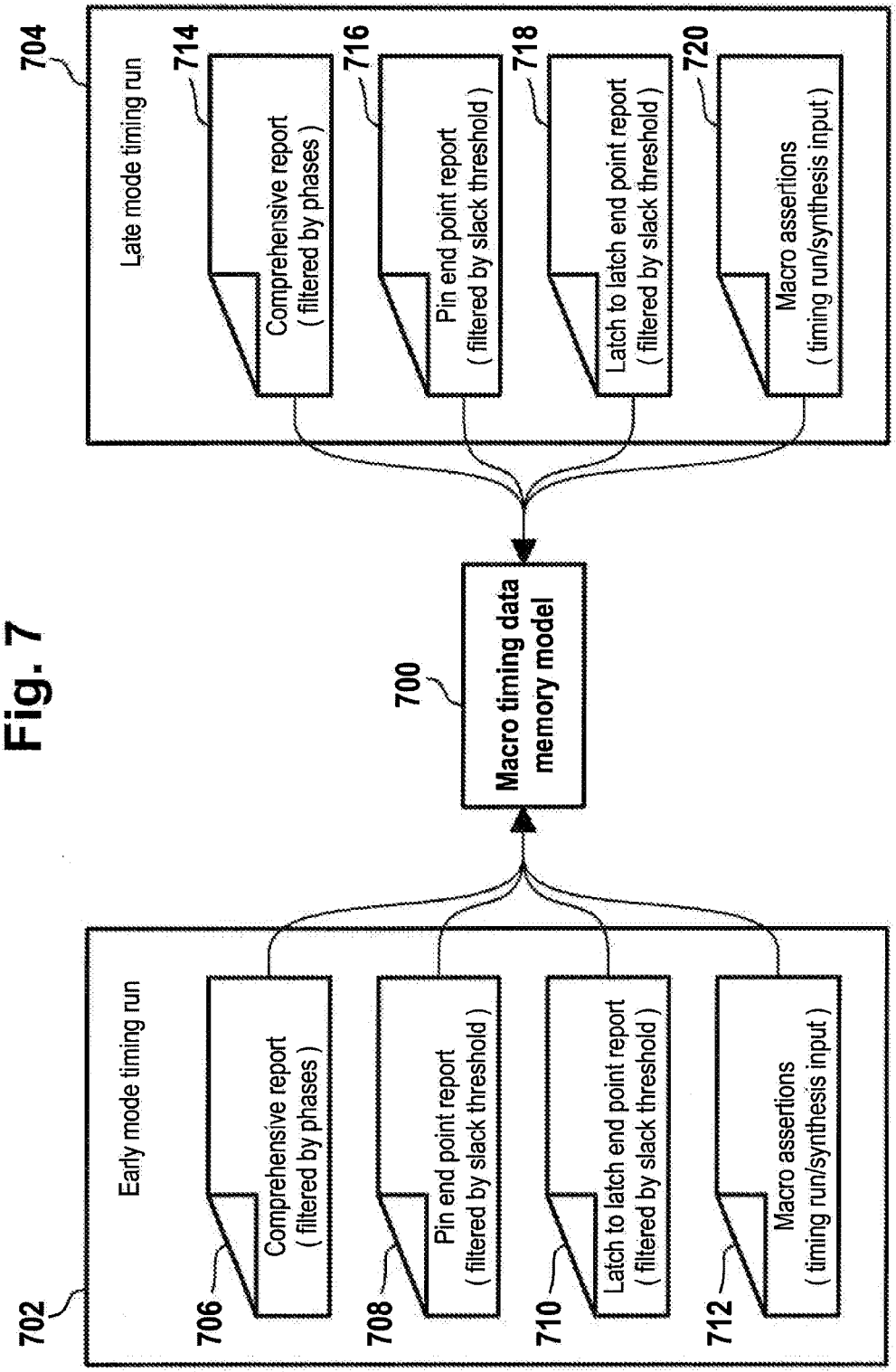
FIG. 7 illustrates the step of loading macro timing data, in accordance with one or more aspects of the present invention.

FIG. 7 explains how the macro timing data is loaded in greater detail. Shown in FIG. 7 there is a macro timing data memory model 700. The macro timing data memory model draws from several groups of files, it draws from a group of files from the early mode timing run 702 and files from the late mode timing run 704. Files included in the early mode timing run may be a comprehensive report 706 possibly filtered by phases, pin end point report possibly filtered by slack threshold 708, latch-to-latch end point report 710 possibly filtered by slack threshold, and macro assertions which may be timing run and/or synthesis input 712. The late mode timing run 704 includes the comprehensive report 714 possibly filtered by phases, a pin end point report 716 which is possibly filtered by slack threshold, latch-to-latch end point report 718 possibly filtered by slack threshold, and macro assertions which may be timing run and/or synthesis input 720.

Figure 8:
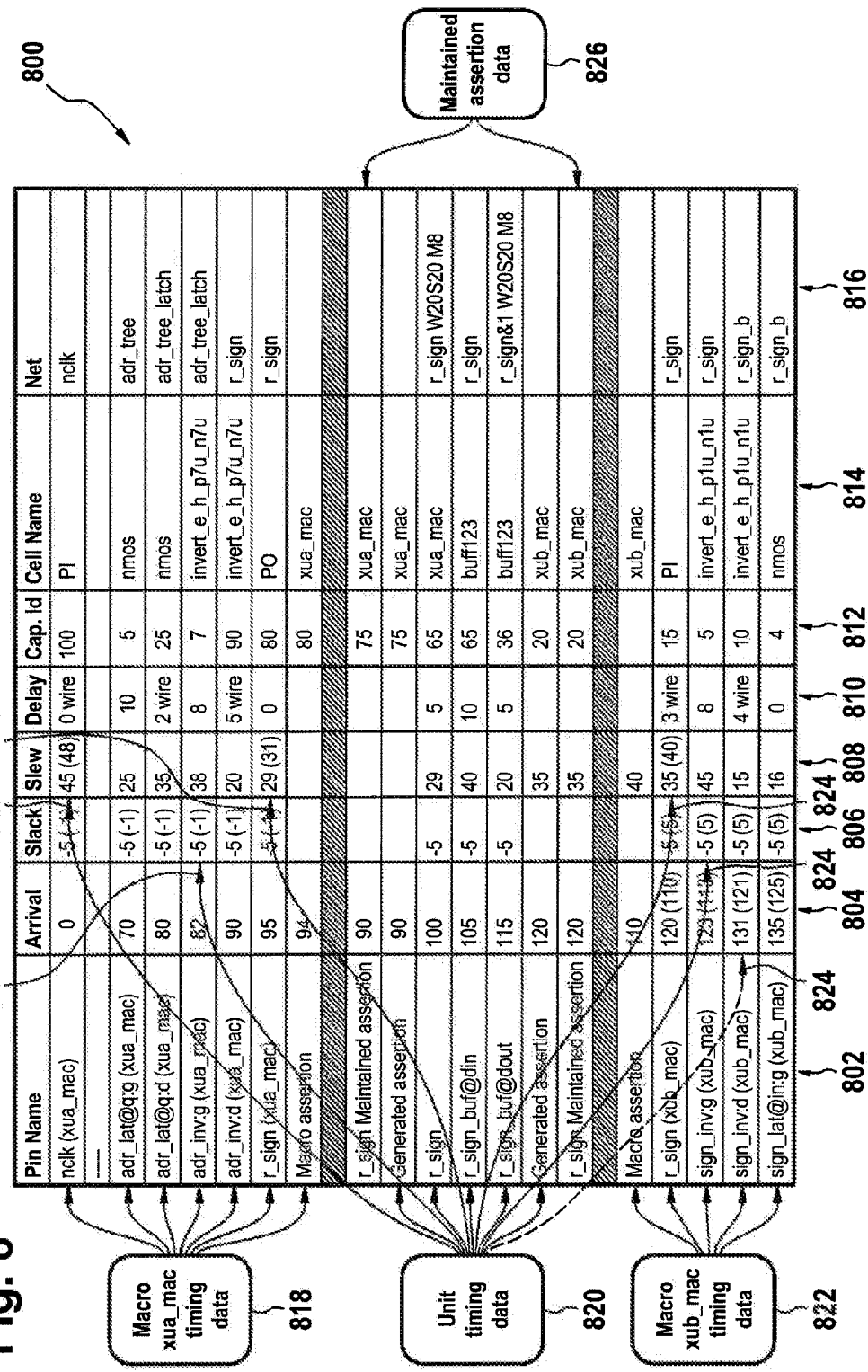
FIG. 8 depicts a graphical representation of an end point report, in accordance with one or more aspects of the present invention.

FIG. 8 shows a graphical representation of a comprehensive end point report 800. In this table there are several columns 802 is the pin name 802, column 804 is the arrival time, column 806 is the slack, column 808 is the slew, column 810 is the delay, column 812 is the capacitive load, column 814 is the cell name, and column 816 is the name of the wire connection. In rows there is data corresponding to a first macro timing data 818, unit timing data 820, and a second macro timing data 822. There is also some data 824 to compensate the glitches caused by using the assertion data. The fields 824 correspond to data which is replaced. In the fields indicated with received data from the arrows 824 there are some values which are shown adjacent to bracketed values. The un-bracketed value is the value of that particular variable. The bracketed value is the data which has been replaced. There is also some data 826 corresponding to maintained assertion data to show the differences to the assertion data generated by the current unit timing simulation.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

What is claimed is:

1. A non-transitory computer-readable storage medium storing machine executable instructions for a processor, wherein execution of the instructions cause the processor to:

load unit timing data from a timing simulation of an integrated circuit into a memory, wherein the unit timing data is descriptive of the timing at the upper hierarchy unit level, and wherein the unit comprises a plurality of macros;

load a selection of a unit timing path through the integrated circuit from the memory;

load macro timing data from the timing simulation into the memory, wherein the macro timing data is descriptive of timing within each of the plurality of macros during the simulation;

replace at least a first portion of a unit timing end point report with the macro timing data along the unit timing path, wherein the unit timing report comprises the unit timing data, wherein the macro timing data replaces at least a first portion of the unit timing data, and wherein at least a second portion of the unit end point report is not replaced with the macro timing data;

compute arrival times, slacks, and slews for the unit timing path using the replaced unit tithing data;

compute path statistics in accordance with the arrival times, slacks and slews; and generate an end point report for the unit timing path including the path statistics.

2. The computer readable storage medium of claim 1, wherein execution of the instructions further causes the processor to recalculate the arrival times and the slacks of the replaced unit timing data in accordance with the unit timing end point report.

3. The computer readable storage medium of claim 2, wherein the generating the end point report comprises summarizing assertion data from the macro and unit timing data adjacent to the arrival times and/or the slacks.

4. The computer readable storage medium of claim 1, wherein execution of the instructions cause the processor to identify the unit timing path in accordance with the unit timing data.

5. The computer readable storage medium of claim 1, wherein a selection of a plurality of unit timing paths is received, wherein the end point report is generated for each of the plurality of unit timing paths.

6. The computer readable storage medium of claim 1, wherein a selection of all unit timing paths is received, wherein the end point report is generated for all of the unit timing paths.

7. The computer readable storage medium of claim 1, wherein the path statistics comprise any one of the following: total path delay, total wire delay, relative wire delay, the total buffer delay, the relative buffer delay, the total wiring delay, the relative wiring delay, total macro delay calculated at the macro level, total macro delay calculated for each macro, relative macro delay, total macro wire delay, relative macro wire delay, and combinations thereof.

8. The computer readable storage medium of claim 1, wherein the unit timing data comprises any one of the following: a higher hierarchy end point report filtered by slack threshold, clock phase, and component name, a higher hierarchy comprehensive report filtered by clock phase and component name, wirecode data, assertions, unit assertions, manually maintained assertion, contract files used to optimally generate new assertions from unit timing, and combinations thereof.

9. The computer readable storage medium of claim 1, wherein the macro timing data comprises any one of the following: macro end point report filtered by slack threshold and/or clock phase, macro comprehensive report, macro assertions, and combinations thereof.

10. The computer readable storage medium of claim 1, wherein execution of the instructions further causes the processor to generate the unit timing data and the macro timing data by simulating the integrated circuit.

11. The computer readable storage medium of claim 10, wherein the unit timing end point report and the macro timing data are calculated iteratively.

12. The computer readable storage medium of claim 1, wherein execution of the instructions further causes the processor to:

detect a set of slew violations over all hierarchy levels of the timing path in the end point report, wherein the set of slew violations are identified for both macro and unit timing points; and generate a slew violation report using the set of slew violations.

13. A computer system comprising a processor, wherein the computer system further comprises a computer readable storage medium storing machine executable instructions, wherein execution of the instructions cause the processor to:

load unit timing data from a timing simulation of an integrated circuit into a memory, wherein the unit timing data is descriptive of the timing at the upper hierarchy unit level, and wherein the unit comprises a plurality of macros;

load a selection of a unit timing path through the integrated circuit from the memory;

load macro timing data from the timing simulation into the memory, wherein the macro timing data is descriptive of timing within each of the plurality of macros during the simulation;

replace at least a first portion of a unit tinning end point report with the macro timing data along the unit timing path, wherein the unit timing report comprises the unit timing data, wherein the macro timing data replaces at least a first portion of the unit timing data, and wherein at least a second portion of the unit end point report is not replaced with the macro timing data;

compute arrival times, slacks, and slews for the unit timing path using the replaced unit timing data;

compute path statistics in accordance with the arrival times, slacks and slews; and generate an end point report for the unit timing path including the path statistics.

14. The computer system of claim 13, wherein execution of the instructions further causes the processor to recalculate the arrival times and the slacks of the replaced unit timing data in accordance with the unit timing end point report.

15. The computer system of claim 14, wherein the generating the end point report comprises summarizing assertion data from the macro and unit timing data adjacent to the arrival times and/or the slacks.

16. The computer system of claim 13, wherein execution of the instructions cause the processor to identify the unit timing path in accordance with the unit timing data.

17. The computer system of claim 13, wherein a selection of a plurality of unit timing paths is received, wherein the end point report is generated for each of the plurality of unit timing paths.

18. The computer system of claim 13, wherein a selection of all unit timing paths is received, wherein the end point report is generated for all of the unit timing paths.

19. The computer system of claim 13, wherein execution of the instructions further causes the processor to:

detect a set of slew violations over all hierarchy levels of the timing path in the end point report, wherein the set of slew violations are identified for both macro and unit timing points; and generate a slew violation report using the set of slew violations.

20. A computer-implemented method comprising:

loading by a computer unit timing data from a timing simulation of an integrated circuit into a memory, wherein the unit timing data is descriptive of the timing at the upper hierarchy unit level, and wherein the unit comprises a plurality of macros;

loading a selection of a unit timing path through the integrated circuit from the memory loading macro timing data from the timing simulation into the memory, wherein the macro timing data is descriptive of timing within each of the plurality of macros during the simulation;

replacing at least a first portion of a unit timing end point report with the macro timing data along the unit timing path, wherein the unit timing end point report comprises unit timing data, wherein the macro timing data replaces at least a first portion of the unit timing data, and wherein at least a first portion of the unit end point report is not replaced with the macro timing data;

computing arrival times, slacks, and slews for the unit timing path using the replaced unit timing data;

computing path statistics in accordance with the arrival times, slacks, and sieves; and generating, by a processor, an end point report for the unit timing path including the path statistics.

* * * * *